J. W. INGLETON.
AEROPLANE.
APPLICATION FILED DEC. 30, 1914.
1,213,377.
Patented Jan. 23, 1917.
5 SHEETS—SHEET 1.
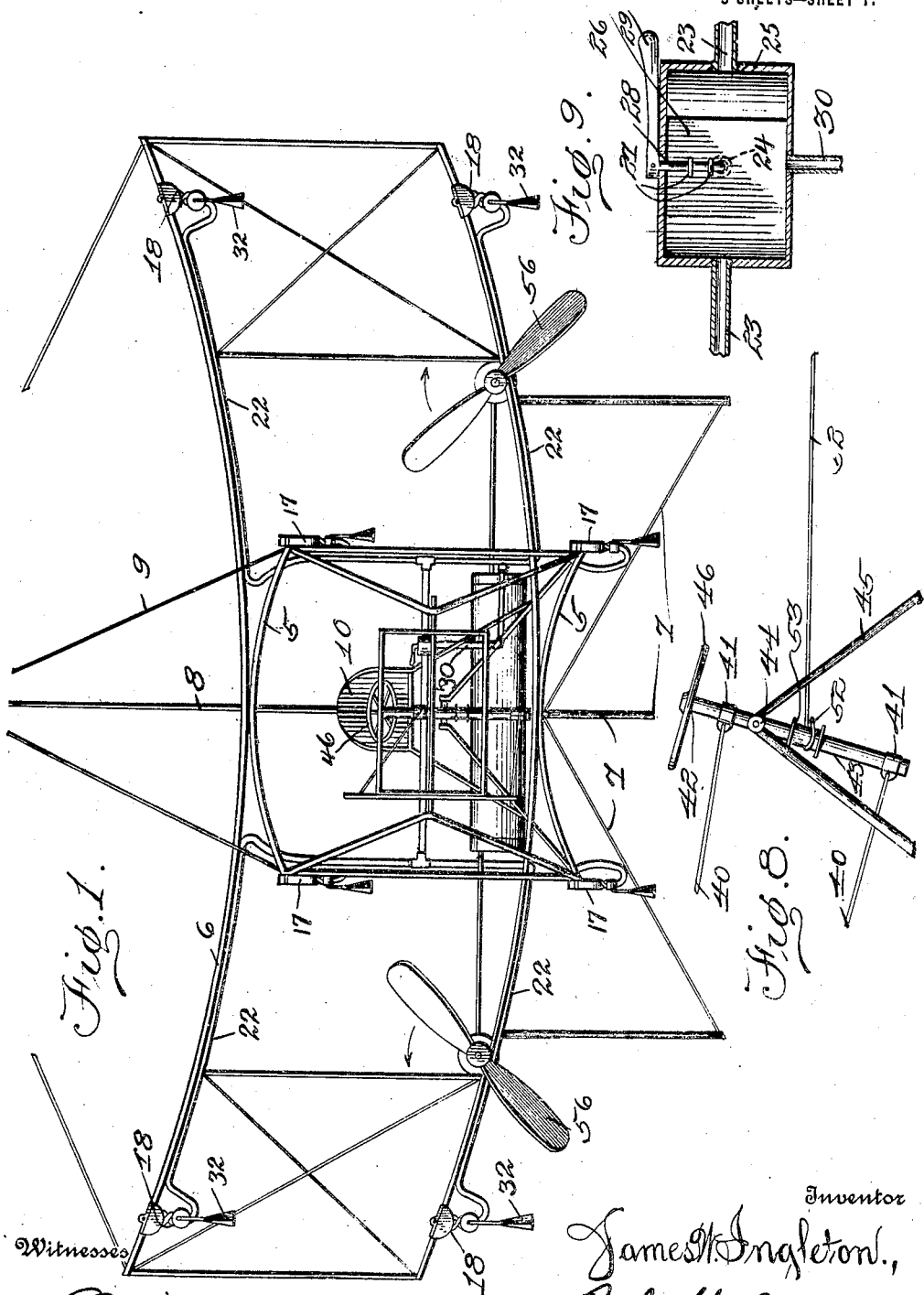

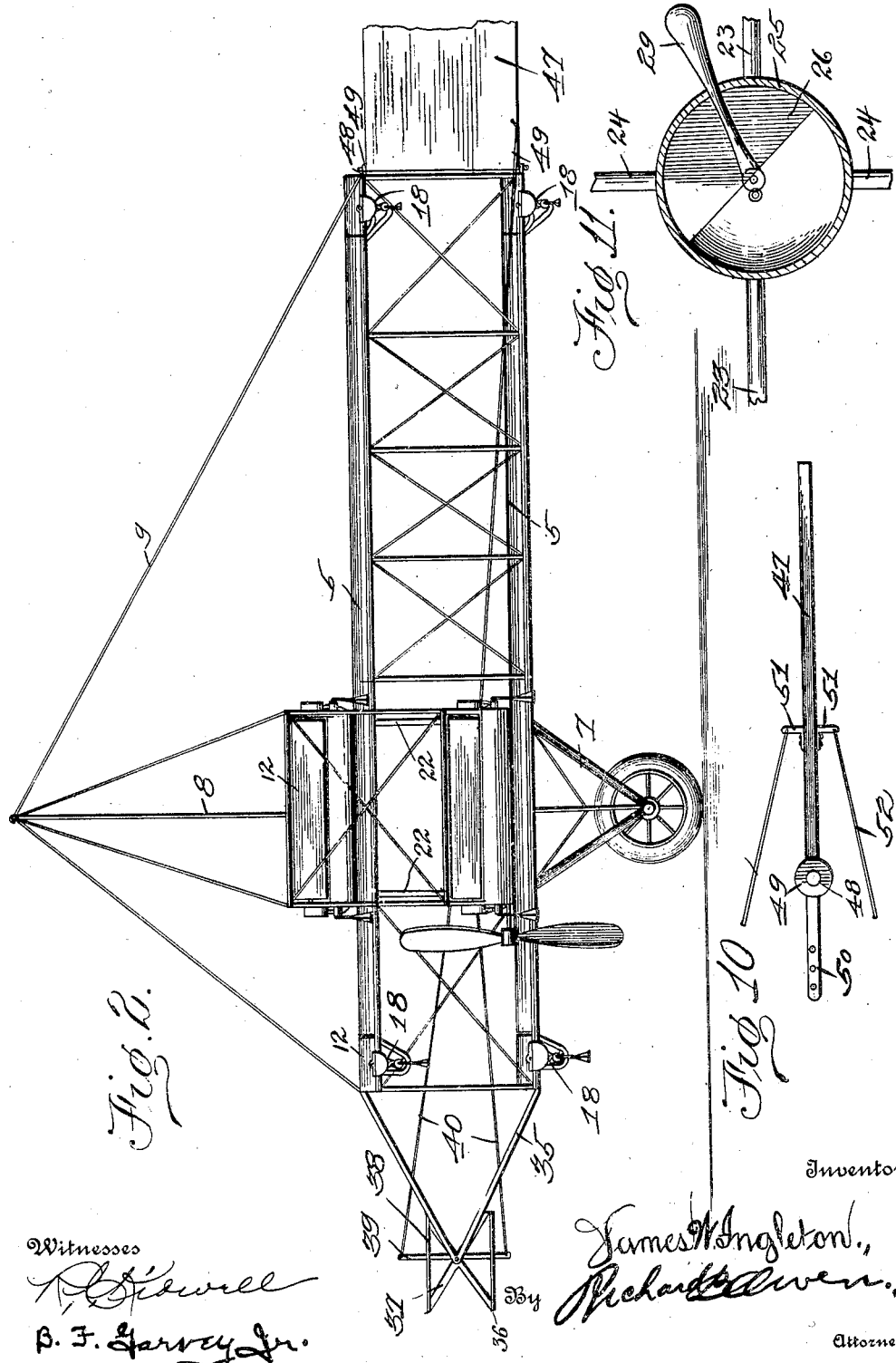

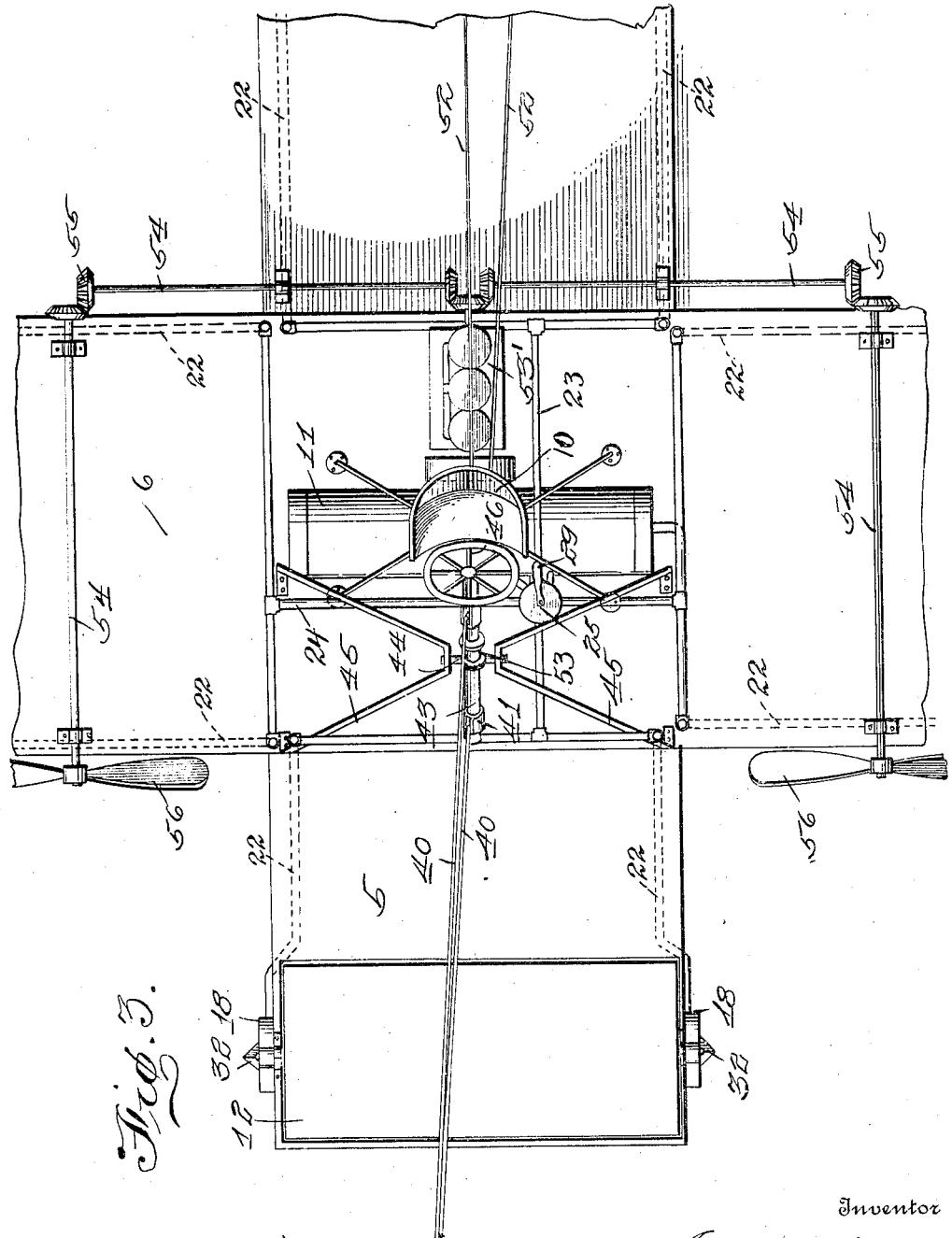

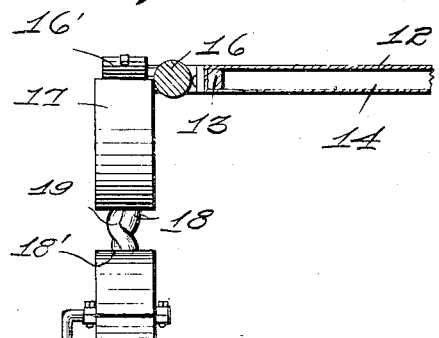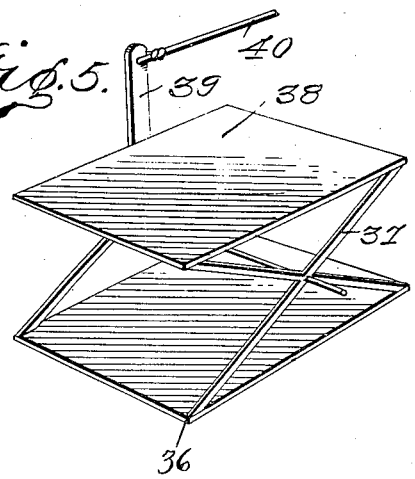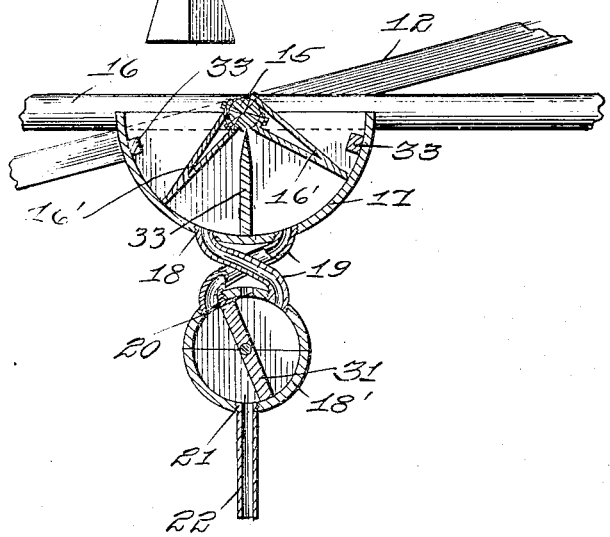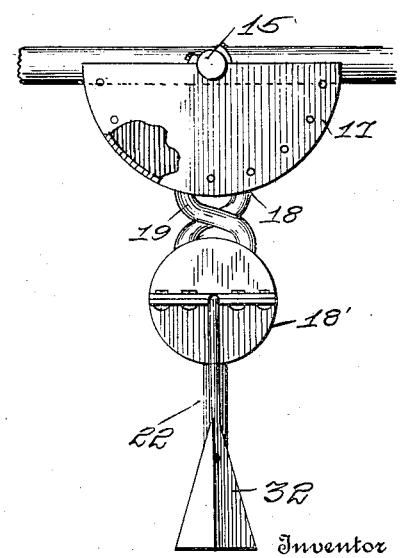

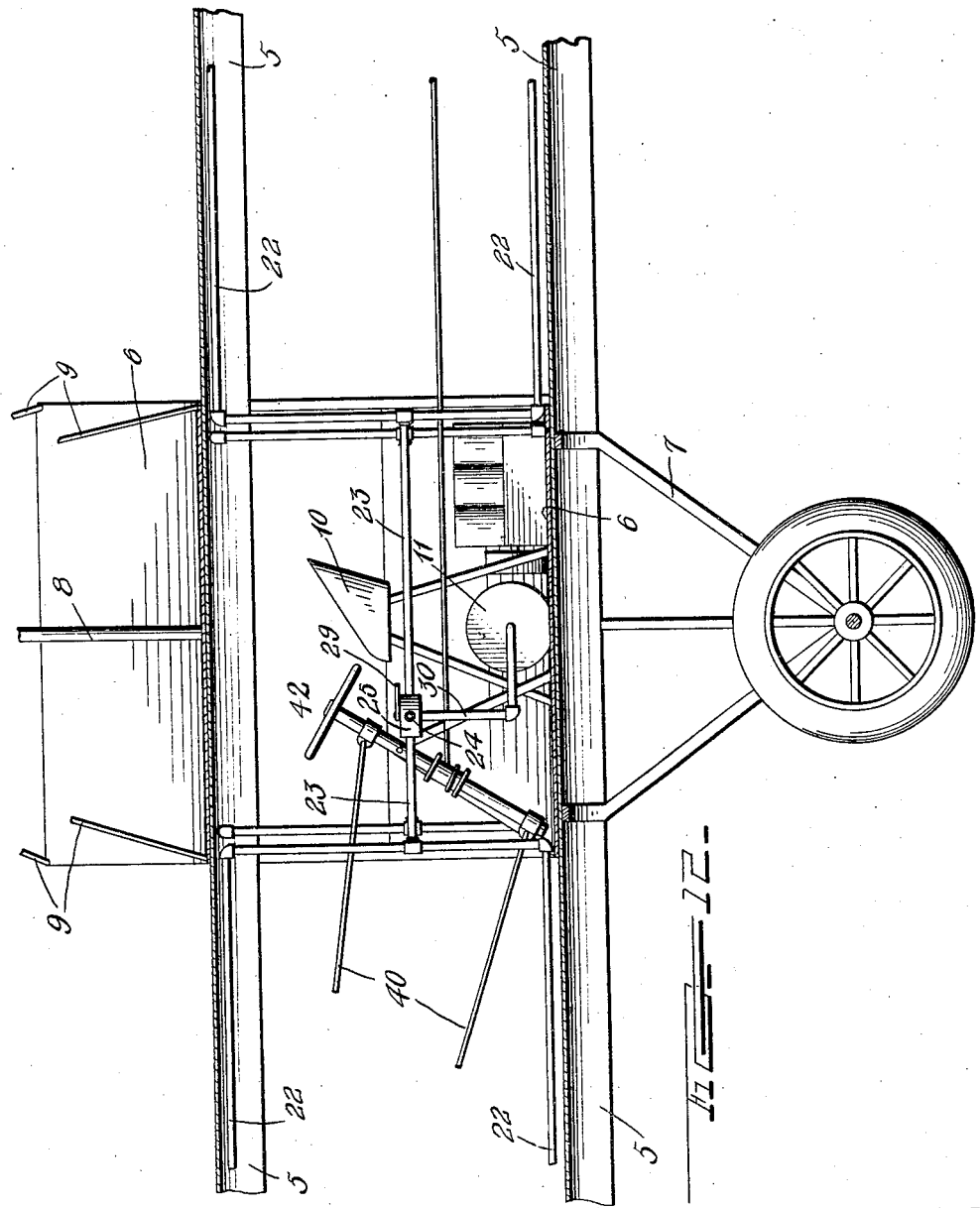

UNITED STATES PATENT OFFICE.

JAMES W. INGLETON, OF ASTORIA, OREGON.

AEROPLANE.

1,213,377. Specification of Letters Patent. Patented Jan. 23, 1917.

Application filed December 30, 1914. Serial No. 879,740.

*To all whom it may concern:*

Be it known that I, JAMES W. INGLETON, a citizen of the United States, residing at Astoria, in the county of Clatsop and State of Oregon, have invented certain new and useful Improvements in Aeroplanes, of which the following is a specification.

This invention relates to aeroplanes or air craft, and has primarily for its object to provide a peculiar formation of planes, to assist in initially raising the craft from the earth and subsequently facilitating stabilization when passing through air stratas of variant pressures, which usually tend to displace the craft.

Another object of the invention is to utilize, in conjunction with the peculiar formation of planes, pendent means to maintain the equilibrium of the craft in altitudes, at the same time not impeding ascent or descent.

Still another object of this invention is to provide a vane, operable from the aviator's seat to facilitate steering when ascending or descending, and to assist in stabilization against longitudinal displacement when traveling in a direct course.

A further object of the invention is to equip the opposite ends of each plane with balancing planes, which are operable when the craft is tilted either laterally or longitudinally, thereby automatically operating air valves for returning the balancing vanes to their normal position.

A still further object resides in a novel form of operating means for the vane and rudder, the vane being operable in a vertical arc either upwardly or downwardly by forward or rearward movement, respectively, of the operating means, while the rudder is operated upon rotation of the operating means.

Other objects as well as the nature, characteristic features and scope of my invention will be more readily understood from the following description taken in connection with the accompanying drawings and pointed out in the claims forming a part of this specification.

Referring to the drawings: Figure 1 is a front elevational view of an aeroplane constructed in accordance with my invention, a portion of the supporting means thereof being broken away, Fig. 2 is a side elevational view of my improved aeroplane, a portion of the rudder being broken away, Fig. 3 is a detail enlarged top plan fragmentary view of the aeroplane, showing the upper planes removed in order to disclose details, Fig. 4 is a side elevational view of the motors for operating the balancing vanes, Fig. 5 is a perspective view of the vane used in the present invention, Fig. 6 is a longitudinal sectional view of one of the balancing vanes, showing the pendulum removed therefrom, and the balancing vane, after the latter has been operated an appreciable distance, Fig. 7 is a front elevational view of one of the motors, showing the same in connection with the air supply pipes, Fig. 8 is a detail enlarged side elevational fragmentary view of the steering means used in the present invention, portions of the vane and rudder operating cables being shown in connection therewith, Fig. 9 is a detail enlarged sectional view of the motor-control valve, which is arranged in proximity to the aviator's seat, Fig. 10 is a top plan view of the rudder illustrating the manner in which it is associated with the planes, and showing portions of the operating cable in connection therewith, Fig. 11 is a detail enlarged horizontal sectional view of the motor-control valve shown in Fig. 9, Fig. 12 is a detail longitudinal sectional view of the craft, parts thereof being broken away, and parts shown in side elevation.

In the drawings wherein is illustrated the preferred embodiment of this invention, a plurality of transversely arranged planes are provided, certain of which, as indicated in the drawings at 5, have the lateral margins thereof turned downwardly, to provide a lower arcuate air engaging face to facilitate initial movement of the craft from the earth. To comprehensively describe the planes throughout the specification, the planes, as indicated in the drawings at 5, will be termed longitudinal planes, while the planes 6, which extend transversely of the planes 5, adjacent the forward terminals of the latter, will be termed lateral planes. The lateral planes 6, as illustrated to advantage in Fig. 1, have the opposite ends thereof curved upwardly so as to reduce possibility of lateral displacement in altitudes, to a minimum.

A supporting mechanism, designated 7 in the drawings, is provided, which is associated with the lower of the planes 5 and has extending upwardly therefrom through the planes 5 and 6, a guy-rod 8, the upper terminal of which is in connection with one end of each of the guy ropes 9, the opposite ends of the latter being in connection with the upper of the planes 5 and 6, as illustrated to advantage in Fig. 2.

An operator's seat 10 is mounted upon the lower of the planes 6, and is arranged in spaced relation thereto, a compressed air tank 11 being arranged subjacent the seat 10 and extending along the longitudinal axis of the lower of the planes 6, as illustrated to advantage in Fig. 3.

Rotatably mounted in the opposite ends of each of the planes is a balancing vane 12, each of which in the present instance is of an oblong configuration, being arranged transversely of the planes, and having pintles 15 extending from their opposite ends which are rotatably mounted in complemental bearings on the planes. Each of the balancing vanes comprises a frame 13, preferably made of wood, which has a covering of canvas 14 or any other suitable flexible material arranged thereover, which will be capable of being very slightly flexed under atmospherical pressure.

The pintles 15 on the opposite ends of each of the balancing planes 12 are revolubly mounted through the sides 16 of the planes 5 and 6, and have fixedly mounted thereon, wings or air-baffles 16', one end of each of which is bifurcated, and the free terminals of the branches of the bifurcation secured to the pintles 15 in any suitable manner. The opposite ends of said wings or baffles snugly engage the inner periphery of semi-circular cups 17, the latter comprising a portion of the motors, generally designated 18, one of said motors being carried by the frame 16 of the planes 5 and 6, adjacent each end of each of the balancing vanes 12, as shown to advantage in Figs. 4, 6 and 7 of the drawings. Each of the cups 17 is in communication with a circular air compartment 18', through the medium of cross pipes or tubes 19, said compartment 18' being provided with diametrically opposite openings 20 and 21, the latter having a tributary pipe 22 extending therethrough, the opposite end of each of said pipes 22 from that which is in engagement with the compartment 18', being in communication with main supply pipes 23 and 24. The pipes 23 and 24 are in turn engaged, and in communication with a valve chamber 25, the latter being of a cylindrical configuration, having its opposite ends closed, and having mounted therein a segmental valve member 26, said valve 26 being slightly smaller than one-half of the chamber 25, taken on a line at diametrically opposite points on the inner periphery of the chamber, directly through the axis of the latter. The straight face of the valve 26 is provided with a plurality of looped eyes 27, which snugly engage a finger 28, the latter depending from one end of a lever 29, said finger likewise serving as an axis upon which the lever 29 is operated. The main supply pipes 23 are adapted to carry the air from the chamber 25 to the tributaries 22 for the motors on the forward and rear ends of the planes 5, while the main supply pipes 24 convey the air to the tributaries 22 for the safeties on the opposite ends of the planes 6. Air is supplied from the compressed air tank 11 to the chamber 25 by a pipe 30, so that the passage of air through the main supply pipes 23 and 24, will at all times be within the control of the operator, since the lever 29 is in proximity to the operator's seat, as illustrated to advantage in Fig. 3, thereby permitting communication to be cut off from either of the pipes 23 or 24 when desired. A valve 31 is revolubly mounted in each of the air compartments 18' and is controlled by the movement of a pendulum 32, the pendulum always lying in a perpendicular position, in view of its weighted end, so that when the craft tilts, the pendulum which is in connection with the valve 31 will thereby establish communication between the tributaries 22 and the compartment 18', permitting the air to be supplied through one of the pipes 19, consistent with the direction in which the valve 31 has been operated, into the cup 17 for operating the baffle or wing 16', consequently imparting movement to the balancing vane 12, so as to expeditiously right the machine, and cause it to assume its normal position.

Stops 33 are mounted on the inner periphery of each of the cups 17, so as to limit the extent of movement of each of the wings or baffles 16', should undue pressure be exerted on the latter, due to the impact of the air which is emitted through the pipes 19 into the cups 17.

Movement of the pendulums 32 relatively to the motors on the planes 5 permits an additional supply of air to enter the cups 17 for operating the baffles or wings 16' consistent with the movement of the pendulums, thereby operating the balancing vanes 12.

It is to be noted that the compartment 18' is in two sections, as illustrated to advantage in Fig. 7, the opening 20 in the upper of each of said sections being for the purpose of emitting air from the compartment 18', so as to offer no air resistance whatsoever to movement of the valve 31, due to the air pressure which is communicated through the pipe 22. A frame 35 extends from the forward ends of the planes 5 and has journaled therein a rudder 36, the latter in the present instance being of a box-like configuration, as shown in Fig. 5, comprising a frame 37, made of wood, metal or any other suitable material, and having canvas strips 38 mounted over the top and bottom of the frame, so as to facilitate steering of the craft in ascending or descending, the rudder having a rod 39 engaged therewith, the opposite ends of which are in engagement with operating cables 40, said cables having their inner ends engaged with collars 41, the latter being carried by the steering mechanism, generally designated 42.

The steering mechanism 42 in the present instance comprises a steering post 43, which is pivoted, as indicated at 44, adjacent its upper end to a frame 45, said frame being carried upon the lower of the planes 6 in front of the operator's seat, as shown to advantage in Fig. 1. It is therefore seen that by the movement of the steering post 43, which is facilitated in view of a steering wheel 46, in a forward direction, that the vane 36 will be actuated downwardly in a vertical arc, while when the steering post is moved in a counter direction, the vane will be operated upwardly in a vertical arc, so as to facilitate steering of the craft when ascending or descending. A rudder 47 is pivotally associated with the rear ends of the planes 5, and has extending laterally from its inner terminal, pintles 48, which are revolubly mounted in complemental bearing plates 49, the latter having elongated perforated shanks 50 extending therefrom through which nails or other suitable securing means are passed, so as to retain said plates in engagement with said planes 5. The rudder 47 is provided with plates 51 on its opposite faces, said plates being in connection with operating cords 52, said cords being engaged with a sleeve 53, the latter being mounted on the steering post 43 approximately midway between said collars 41, as shown to advantage in Fig. 8. The sleeve 53 has the opposite ends thereof turned at right angles to the body, so as to provide guard flanges for preventing the accidental displacement of the cords 52 therefrom.

An engine 53' of any conventional form is mounted upon the lower of the planes 6, and is in operative relation through the medium of a plurality of shafts and pinions 54 and 55, respectively, with propellers 56, for transmitting motion to the latter when the engine is operated, the propellers being mounted to operate in different directions in order to facilitate propulsion.

The operation of the device is as follows: When it is desired to initially move the craft from the earth, communication is first closed through the main supply pipes 23 and 24 from the chamber 25, thereby preventing the entrance of air through the tributaries 22 of the motors on the planes 5, thereby in no way impeding ascent of the craft, but as soon as the craft has reached the desired height, the valve 26 is opened, so as to establish communication through the pipes 23 and 24, thereby permitting operation of the balancing vanes 12 of the planes 5, should the craft be longitudinally displaced when traveling in altitudes. The steering of the craft is, of course, done by the steering mechanism 42, and as previously set forth, the movement of the steering post 43 in a forward or rearward direction, transversely of the planes 6 will operate the vane 36 for steering the craft in ascending or descending, whereas rotation of the steering post 43 will operate the rudder 47 to steer the craft laterally when traveling in a stratum of air parallel, or substantially parallel with the earth. When it is desired to descend, the valve 26, is, of course, again closed, thereby rendering the balancing vanes 12 of the planes 5 inoperative.

It will be understood that the above description and accompanying drawings comprehend only the general and preferred embodiment of my invention and that various minor changes in details of construction, proportion and arrangement of parts may be made within the scope of the appended claims without sacrificing any of the advantages of my invention.

Having thus fully described my invention, what I claim as new and desire to secure by Letters Patent is:

1. An air craft including transversely arranged planes, a balancing vane mounted in each end of the planes and movable therein to be automatically operated when said planes are tilted, an air cup carried by each side of each of the terminals of said planes having a partition therein to divide said cup into two parts, and an air supply pipe in communication with each of said parts of the cup, an air baffle movable in each of said parts and in connection with the vane, and a valve automatically operable by the tilting of the craft to open communication to either of said air supply pipes, whereby pressure is exerted upon either one of said baffles for re-adjusting the vane to insure stabilization of the craft.

2. An air craft including planes, a balancing vane movably mounted in each of said planes and automatically movable when the planes are tilted, air baffles associated with the opposite ends of each of said balancing vanes, cups housing said baffles, each of which is equipped with a partition to coact with said baffles, an air supply pipe communicating with said cup on the opposite sides of said partitions, and a valve for normally closing communication through said air pipes, and automatically permitting communication through either of the pipes of the cup when the craft is tilted.

3. An air craft including lateral and longitudinal planes, balancing vanes associated with each of said planes and operable upon displacement of the craft, motors associated with the vanes, air supply pipes in connection with said motors to control the latter for holding the vanes in a predetermined position, and a valve member for closing communication through certain of the supply pipes to hold the vanes of said longitudinal planes in a fixed position when ascending or descending.

4. An air craft including planes, balancing vanes mounted in the opposite terminals of each plane, a pair of motors in connection with each vane to insure predetermined positioning of the latter, and means common to all of said motors to control movement of the latter.

5. An aeroplane including longitudinally and transversely extending planes, a balancing vane mounted in each terminal of each of said planes, motors in connection with said vanes and automatically movable under tilting movement of the planes, mechanism for transmitting motive energy to said motors for operating the latter and means common to said mechanism for rendering the motors of either the longitudinally or transversely extending planes inoperative.

6. An aeroplane including longitudinally and transversely extending planes, supporting means projected beyond one end of said longitudinally extending planes, a vane rotatably mounted in said supporting means, remote from said planes, a rudder carried by the opposite ends of said longitudinally extending planes, and means mounted on said transversely extending planes at the jointure of the latter with the longitudinal planes, and in connection with said vane and rudder for simultaneously operating the same.

In testimony whereof I affix my signature in presence of two witnesses.

JAMES W. INGLETON.

Witnesses:
  LAWRENCE ROSS,
  FRANK ASHLEY.